US012299559B2

(12) United States Patent
Moshovos et al.

(10) Patent No.: US 12,299,559 B2
(45) Date of Patent: May 13, 2025

(54) NEURAL NETWORK PROCESSING ELEMENT OF ACCELERATOR TILE

(71) Applicant: SAMSUNG ELECTRONICS CO., LTD., Suwon-si (KR)

(72) Inventors: Andreas Moshovos, Toronto (CA); Mostafa Mahmoud, Toronto (CA); Sayeh Sharifymoghaddam, Toronto (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 1198 days.

(21) Appl. No.: 17/052,178

(22) PCT Filed: Apr. 25, 2019

(86) PCT No.: PCT/CA2019/050525
§ 371 (c)(1),
(2) Date: Oct. 31, 2020

(87) PCT Pub. No.: WO2019/213745
PCT Pub. Date: Nov. 14, 2019

(65) Prior Publication Data
US 2021/0125046 A1    Apr. 29, 2021

Related U.S. Application Data

(60) Provisional application No. 62/668,363, filed on May 8, 2018.

(51) Int. Cl.
*G06N 3/063*     (2023.01)
*G06N 3/045*     (2023.01)

(52) U.S. Cl.
CPC ............. *G06N 3/063* (2013.01); *G06N 3/045* (2023.01)

(58) Field of Classification Search
CPC .............................. G06N 3/063; G06N 3/045
See application file for complete search history.

(56) References Cited

U.S. PATENT DOCUMENTS

| | | | |
|---|---|---|---|
| 9,928,460 B1 | 3/2018 | Nowatzyk et al. | |
| 2010/0146030 A1* | 6/2010 | Erle | G06F 7/491 |
| | | | 708/624 |

(Continued)

FOREIGN PATENT DOCUMENTS

| | | |
|---|---|---|
| CA | 2990709 C | 11/2017 |
| CA | 2990712 C | 12/2017 |

(Continued)

OTHER PUBLICATIONS

Albericio et al. (Bit-Pragmatic Deep Neural Network Computing, Oct. 2016, pp. 1-12) (Year: 2016).*

(Continued)

*Primary Examiner* — George Giroux
(74) *Attorney, Agent, or Firm* — NSIP Law

(57) ABSTRACT

Described is a neural network accelerator tile. It includes an activation memory interface for interfacing with an activation memory to receive a set of activation representations and a weight memory interface for interfacing with a weight memory to receive a set of weight representations, and a processing element. The processing element is configured to implement a one-hot encoder, a histogrammer, an aligner, a reducer, and an accumulation sub-element which process the set of activation representations and the set of weight representations to produce a set of output representations.

20 Claims, 11 Drawing Sheets

(56) References Cited

U.S. PATENT DOCUMENTS

| | | | | |
|---|---|---|---|---|
| 2013/0159367 | A1* | 6/2013 | Dubrovin | G06F 7/5336 708/209 |
| 2018/0246855 | A1* | 8/2018 | Redfern | G06F 17/16 |

FOREIGN PATENT DOCUMENTS

| | | |
|---|---|---|
| CN | 107851214 A | 3/2018 |
| WO | WO 2017/201627 A1 | 11/2017 |
| WO | WO 2017/214728 A1 | 12/2017 |

OTHER PUBLICATIONS

Liu et al. (Design of Approximate Radix-4 Booth Multipliers for Error-Tolerant Computing, Aug. 2017, pp. 1435-1441) (Year: 2017).*

Zhao et al. (An energy-efficient coarse grained spatial architecture for convolutional neural networks AlexNet, Jul. 2017, pp. 1-12) (Year: 2017).*

He et al. (A New Redundant Binary Booth Encoding for Fast 2n-Bit Multiplier Design, Jun. 2009, pp. 1192-1201) (Year: 2009).*

Ganesh et al. (Constructing a low power multiplier using Modified Booth Encoding Algorithm in redundant binary number system, May 2012, pp. 2734-2740) (Year: 2012).*

Efstathiou et al. (Efficient modulo 2n+1 multiply and multiply-add units based on modified booth encoding, Apr. 2013, pp. 140-147) (Year: 2013).*

International Search Report and Written Opinion, PCT/CA2019/050525, Jul. 16, 2019.

Knagge, Geoff, "Booth Recoding". GeotlKnagge.com, Jul. 27, 2010 (Jul. 27, 2010),, [online] [retrieved on Jun. 28, 2019 (Jun. 28, 2019)]. Retrieved from the Internet: <https://web.archive.org/web/20160303211337/http://www.geoffknagge.com/fyp/booth.shtml>.

Albericio, A. Delmás, P. Judd, S. Sharify, G. O'Leary, R. Genov, and A. Moshovos, "Bit-pragmatic deep neural network computing," in Proceedings of the 50th Annual IEEE/ACM International Symposium on Microarchitecture, MICRO-50 17, pp. 382-394, 2017.

J. Albericio, P. Judd, T. Hetherington, T. Aamodt, N. Enright Jerger,and A. Moshovos, "CNVLUTIN: Ineffectual-Neuron-Free DeepNeural Network Computing," in Proceedings of the InternationalSymposium on Computer Architecture, 2016.

A. Parashar, M. Rhu, A. Mukkara, A. Puglielli, R. Venkatesan,B. Khailany, J. Emer, S. W. Keckler, and W. J. Dally, Scnn: An accelerator for compressed-sparse convolutional neural networks,in Proceedings of the 44th Annual International Symposium on Computer Architecture, ISCA '17, (New York, NY, USA), pp. 27-40, ACM, 2017.

P. Judd, J. Albericio, T. Hetherington, T. Aamodt, and A. Moshovos, Stripes: Bit-serial Deep Neural Network Computing ,in Proceedings of the 49th Annual IEEE/ACM International Symposium on Microarchitecture, MICRO-49, 2016.

A. Delmas, P. Judd, S. Sharify, and A. Moshovos, Dynamic stripes: Exploiting the dynamic precision requirements of activation values in neural networks, CoRR, vol. abs/1706.00504, 2017.

S. Sharify, A. D. Lascorz, P. Judd, and A. Moshovos, Loom: Exploiting weight and activation precisions to accelerate convolutional neural networks,CoRR, vol. abs/1706.07853, 2017.

Chen, T. Luo, S. Liu, S. Zhang, L. He, J. Wang, L. Li, T. Chen, Z. Xu, N. Sun, and O. Temam, Dadiannao: A machine-learning supercomputer,in Microarchitecture (MICRO), 2014 47th Annual IEEE/ACM International Symposium on, pp. 609-622, Dec. 2014.

Synopsys, Design Compiler Graphical. http://www.https://www.synopsys.com/implementation-and-signoff/rtl-synthesis-test/design-compiler-graphical.html., downloaded on Feb. 26, 2021.

Cadence, "Encounter rtl compiler. https://www.cadence.com/zh_CN/home/company/newsroom/press-releases/pr/2004/cadencedeliversencounterrtlcompilerultrawithsupportforvhdl.html", downloaded on Feb. 26, 2021.

N. Muralimanohar and R. Balasubramanian, Cacti 6.0: A tool to understand large caches,2015.

M. Poremba, S. Mittal, D. Li, J. Vetter, and Y. Xie, Destiny: A tool for modeling emerging 3d nvm and edram caches,in Design, Automation Test in Europe Conference Exhibition (DATE), 2015, pp. 1543-1546, Mar. 2015.

Yang, Tien-Ju and Chen, Yu-Hsin and Sze, Vivienne, Designing Energy-Efi①)cient Convolutional Neural Networks using Energy-Aware Pruning,n IEEE Conference on Computer Vision and Pattern Recognition (CVPR), 2017.

A. Delmas, S. Sharify, P. Judd, M. Nikolic, and A. Moshovos, Dpred: Making typical activation values matter in deep learning computing,CoRR, vol. abs/1804.06732, 2018.

Ghodrati et al., "Bit-Parallel Vector Composability for Neural Acceleration", 2020 57th ACM/IEEE Design Automation Conference (DAC), IEEE, San Francisco, CA, USA, Jul. 2020, pp. 1-6.

"Cadence Delivers Encounter RTL Compiler Ultra with Support for VHDL Cadence Provides Superior Quality of Silicon throughout the Design Chain", Cadence.com, Cadence Design Systems, Inc., San Jose, CA, USA, Feb. 17, 2004, pp. 1-4.

Awad et al., "FPRaker: A Processing Element for Accelerating Neural Network Training", ArXiv.org, ArXiv, Oct. 15, 2020.

Delmas Lascorz et al., "Bit-Tactical: A Software/Hardware Approach to Exploiting Value and Bit Sparsity in Neural Networks", ASPLOS '19: Proceedings of the Twenty-Fourth International Conference on Architectural Support for Programming Languages and Operating Systems, Association for Computing Machinery, New York, NY, USA, Apr. 2019, pp. 749-763.

Albericio, Jorge, et al. "Bit-Pragmatic Deep Neural Network Computing." Proceedings of the 50th annual IEEE/ACM international symposium on microarchitecture. 2017, (13 pages).

Garland, James, et al. "Low Complexity Multiply-Accumulate Units for Convolutional Neural Networks with Weight-Sharing." ACM Transactions on Architecture and Code Optimization (TACO) 15.3 (2018): 1-24.

Delmas, Alberto, et al. "Bit-tactical: Exploiting Ineffectual Computations in Convolutional Neural Networks: Which, Why, and How." arXiv preprint arXiv:1803.03688, Mar. 9, 2018, (14 pages).

Chinese Office Action issued on Jan. 5, 2024, in counterpart Chinese Patent Application No. 201980031107.3 (10 pages in English, 9 pages in Chinese).

* cited by examiner 1100  0 value skip: A
1200  0 value skip: A+W
1300  static prec: Ap
1400  static prec: Ap+Wp
1500  0 Bit skip without booth: Ab
1600  0 Bit skip without booth: Ab+Wb
1700  0 Bit skip with booth: At
1800  0 Bit skip with booth: At+Wt

NEURAL NETWORK PROCESSING ELEMENT OF ACCELERATOR TILE

FIELD OF THE INVENTION

The present specification relates generally to neural networks, and relates specifically to implementing a processing element of a neural network.

BACKGROUND OF THE INVENTION

Modern computing hardware is energy constrained. Reducing the energy needed to perform computations is often essential in improving performance.

For example, many of the computations performed by convolutional neural networks during inference are due to 2D convolutions. 2D convolutions entail numerous multiply-accumulate operations where most of the work is due to the multiplication of an activation and a weight. Many of these multiplications are ineffectual.

The training or running or other use of neural networks often includes the performance of a vast number of computations. Performing less computations typically results in efficiencies such as time and energy efficiencies.

SUMMARY OF THE INVENTION

In an aspect of the present invention, there is provided a neural network accelerator tile, comprising: an activation memory interface for interfacing with an activation memory to receive a set of activation representations; a weight memory interface for interfacing with a weight memory to receive a set of weight representations; and a processing element configured to implement a one-hot encoder, a histogrammer, an aligner, a reducer, and an accumulation sub-element to process the set of activation representations and the set of weight representations to produce a set of output representations.

In an aspect of the present invention, there is provided a method of producing a neural network partial product, comprising receiving a set of activation representations; receiving a set of weight representations, each weight representation corresponding to an activation representation of the set of activation representations; combining the set of weight representations with the set of activation representations by combining each weight representation with its corresponding activation representation to produce a set of partial results; encoding the set of partial results to produce a set of one-hot representations; accumulating the set of one-hot representations into a set of histogram bucket counts; aligning the counts of the set of histogram bucket counts according to their size; and reducing the aligned counts of the set of histogram bucket counts to produce the neural network partial product.

Other aspects and features according to the present application will become apparent to those ordinarily skilled in the art upon review of the following description of embodiments of the invention in conjunction with the accompanying figures.

BRIEF DESCRIPTION OF THE DRAWINGS

The principles of the invention may better be understood with reference to the accompanying figures provided by way of illustration of an exemplary embodiment, or embodiments, incorporating principles and aspects of the present invention, and in which.

Like reference numerals indicated like or corresponding elements in the drawings.

DETAILED DESCRIPTION OF THE EMBODIMENTS

Figure 1:
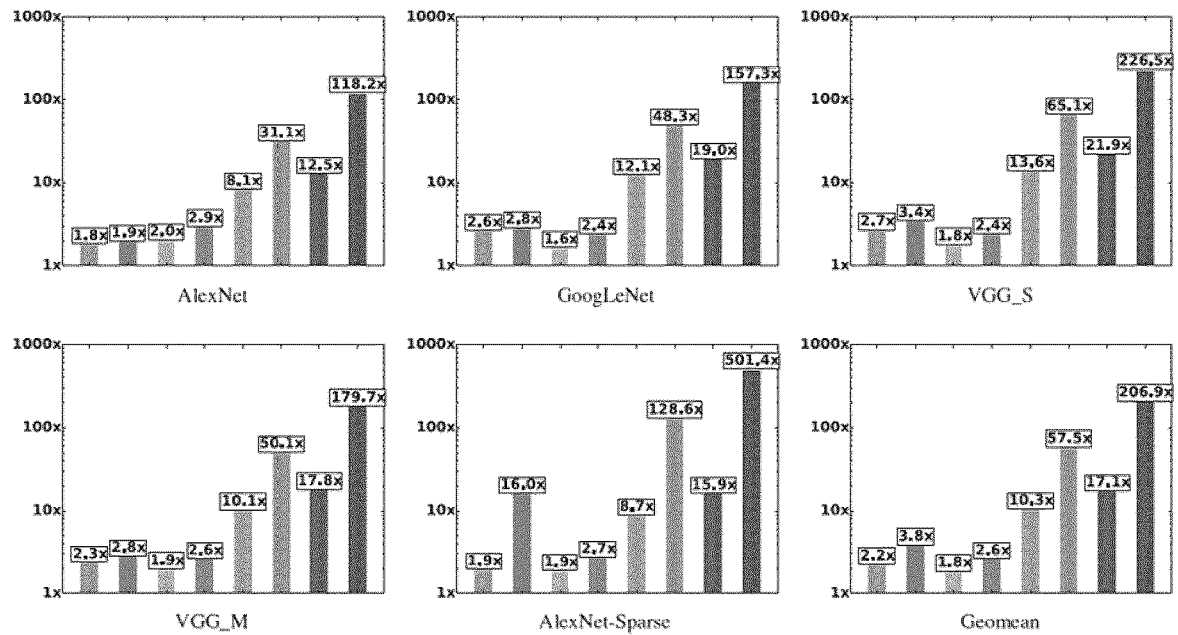
FIG. 1 is a set of bar graphs comparing the average work reduction of eight example computational arrangements across a set of networks.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order to more clearly depict certain features of the invention.

This description relates to accelerators for decomposing multiplications down to the bit level to reduce the amount of work performed, such as the amount of work performed during inference for image classification models. Such reductions can improve execution time and improve energy efficiency.

This description further relates to accelerators which can improve the execution time and energy efficiency of Deep Neural Network (DNN) inferences. Although, in some embodiments some of the work reduction potential is given up yielding a low cost, simple, and energy efficient design.

As much modern computing hardware is energy-constrained, developing techniques to reduce the amount of energy needed to perform a computation is often essential for improving performance. For example, the bulk of the work performed by most convolutional neural networks during inference is due to 2D convolutions. These convolutions involve a great many multiply-accumulate operations, for which most work is due to the multiplication of an activation A and a weight W. Reducing the number of ineffectual operations may greatly improve energy efficiency.

A variety of computational arrangements have been suggested to decompose an A×W multiplication into a collection of simpler operations. For example, if A and W are 16b fixed-point numbers, A×W can be approached as 256 1b×1b multiplications or 16 16b×1b multiplications.

FIG. 1 includes six bar graphs, one graph for each of six models used in testing a set of eight example computational arrangements. Each bar graph compares the potential reduction in work for the eight compared computational arrangements.

The leftmost bar 1100 in each bar graph represents a first computational arrangement which avoids multiplications where the activation is zero, and is representative of the first generation of value-based accelerators which were motivated by the relatively large fraction of zero activations that occur in convolutional neural networks (see for example J. Albericio, P. Judd, T. Hetherington, T. Aamodt, N. Enright Jerger, and A. Moshovos, "CNVLUTIN: Ineffectual-Neuron-Free Deep Neural Network Computing," in Proceedings of the International Symposium on Computer Architecture, 2016, hereby incorporated by reference).

The second bar from the left 1200 in each graph represents a second computational arrangement which skips those multiplications where either the activation or the weight are zero, and is representative of accelerators that target sparse models where a significant fraction of synaptic connections have been pruned (see for example A. Parashar, M. Rhu, A. Mukkara, A. Puglielli, R. Venkatesan, B. Khailany, J. Emer, S. W. Keckler, and W. J. Dally, "Scnn: An accelerator for compressed-sparse convolutional neural networks," in Proceedings of the 44th Annual International Symposium on Computer Architecture, ISCA '17, (New York, NY, USA), pp. 27-40, ACM, 2017, hereby incorporated by reference).

The third and fourth bars from the left 1300 and 1400 represent third and fourth computational arrangements, respectively, which target precision. The third computational arrangement, represented by bar 1300, targets the precision of the activations (see for example P. Judd, J. Albericio, T. Hetherington, T. Aamodt, and A. Moshovos, "Stripes: Bit-serial Deep Neural Network Computing," in Proceedings of the 49th Annual IEEE/ACM International Symposium on Microarchitecture, MICRO-49, 2016 and A. Delmas, P. Judd, S. Sharify, and A. Moshovos, "Dynamic stripes: Exploiting the dynamic precision requirements of activation values in neural networks," CoRR, vol. abs/1706.00504, 2017, both hereby incorporated by reference), and the fourth computational arrangement, represented by bar 1400, targets the precision of activations and weights (see for example S. Sharify, A. D. Lascorz, P. Judd, and A. Moshovos, "Loom: Exploiting weight and activation precisions to accelerate convolutional neural networks," CoRR, vol. abs/1706.07853, 2017, hereby incorporated by reference).

Further potential for work reduction exists if multiplication is decomposed at the bit level. For example, assuming these multiplications operate on 16b fixed-point values, the multiplication is given by equation (1) below:

$$A \times W = \sum_{i=0}^{15} \sum_{j=0}^{15} A_i \text{ AND } W_j \quad (1)$$

In equation (1) above, $A_i$ and $W_j$ are bits of A and W respectively. When decomposed down to the individual 256 single bit multiplications, only those multiplications where $A_i$ and $W_j$ are non-zero are effectual.

The fifth and sixth bars from the left 1500 and 1600 represent fifth and sixth computational arrangements, respectively, which decompose multiplications into single bit multiplications. The fifth computational arrangement, represented by bar 1500, skips single bit multiplications where the activation bit is zero (see for example J. Albericio, A. Delmás, P. Judd, S. Sharify, G. O'Leary, R. Genov, and A. Moshovos, "Bit-pragmatic deep neural network computing," in Proceedings of the 50th Annual IEEE/ACM International Symposium on Microarchitecture, MICRO-50 '17, pp. 382-394, 2017, hereby incorporated by reference). The sixth arrangement, represented by bar 1600, skips single bit multiplications where either the activation or the weight bit is zero.

However, in some arrangements rather than representing A and W as bit vectors, they can instead be Booth-encoded as signed powers of two, or higher radix terms. The seventh and eighth bars from the left 1700 and 1800 represent seventh and eighth computational arrangements, respectively, in which values are Booth-encoded as signed powers of two or as higher radix terms instead of being represented as bit vectors. The seventh arrangement, represented by bar 1700, Booth-encodes the activation values, while the eighth arrangement, represented by bar 1800, Booth-encodes both activation and weight values. The multiplication of activations by weights is then given by equation (2) below:

$$A \times W = \sum_{i=0}^{A_{terms}} \sum_{j=0}^{W_{terms}} At_i \times Wt_j \quad (2)$$

In equation (2) above, $At_i$ and $Wt_j$ are of the form $\pm 2^x$. As with the positional representation, it is only those products where both $At_i$ and $Wt_j$ are non-zero that are effectual. Accordingly, FIG. 1 shows the potential reduction in work where ineffectual terms for a Booth-encoded activation are skipped with 1700 (see for example J. Albericio, A. Delmás, P. Judd, S. Sharify, G. O'Leary, R. Genov, and A. Moshovos, "Bit-pragmatic deep neural network computing," in Proceedings of the 50th Annual IEEE/ACM International Symposium on Microarchitecture, MICRO-50 '17, pp. 382-394, 2017, incorporated by reference above), and shows the potential reduction in work where ineffectual terms for a Booth-encoded activation and Booth-encoded weight are skipped with 1800.

As indicated by FIG. 1, a hardware accelerator which computes only effective terms, such as effective terms of Booth-encoded activations and weights, has the potential to greatly reduce computational work. In many embodiments, configurations which target Booth-encoded computations can also be used to compute bit vector representations as well.

Figure 2:
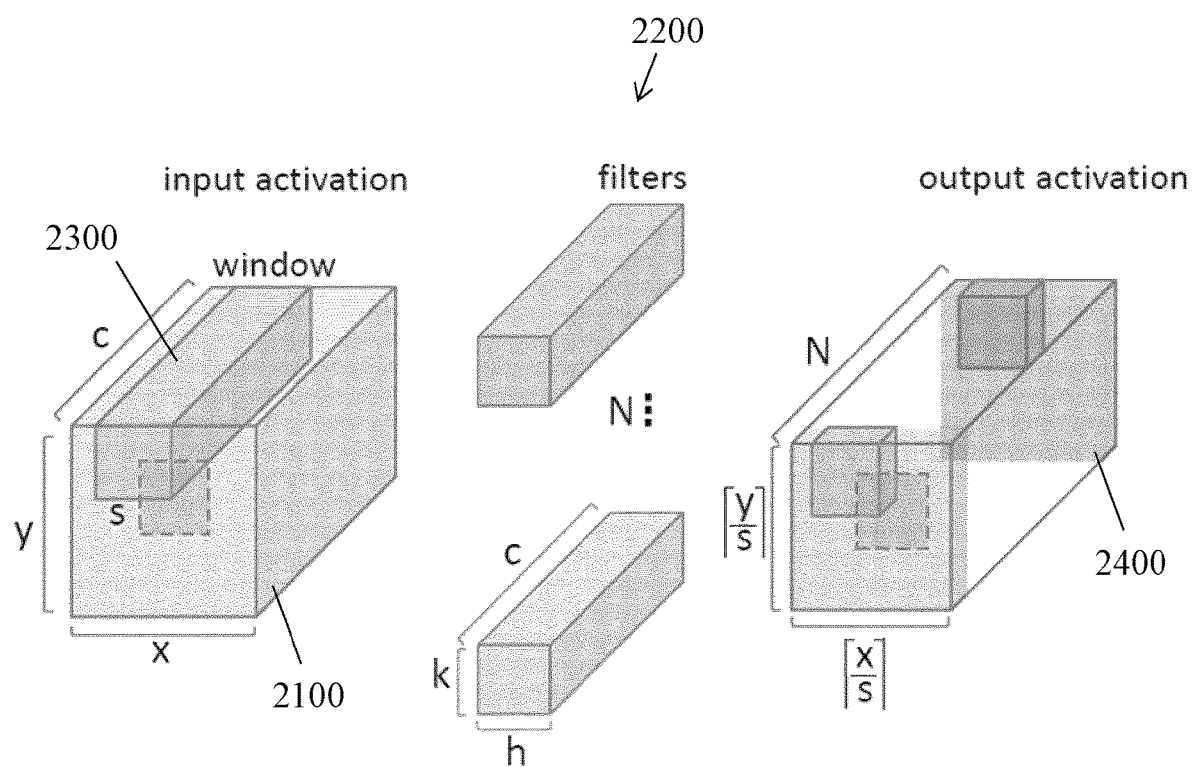
FIG. 2 is a schematic diagram of an example convolutional layer.

Computational arrangements may be used in the implementation of neural networks, such as convolutional neural networks ('CNN'). CNNs usually consist of several convolutional layers followed by a few fully connected layers, and in image processing most of the operation time is spent on processing convolutional layers in which a 3D convolution operation is applied to the input activations producing output activations. An example of a convolutional layer is shown in FIG. 2, which shows a c×x×y input activation block 2100 and a set of N c×h×k filters 2200. The layer dot products each of these N filters (denoted $f^0, f^1, \ldots, f^{N-1}$) 2200 by a c×h×k subarray of input activation (or 'window'), such as window 2300, to generate a single $o_h \times o_k$ output activation 2400. Convolving N filters and an activation window results in N $o_h \times o_k$ outputs which will be passed to the input of the next layer. The convolution of activation windows and filters takes place in a sliding window fashion with a constant stride S. Fully connected layers can be implemented as convolutional layers in which filters and input activations have the same dimensions (x=h and y=k).

Data parallel engines, such as using 16b fixed-point activations and weights, have been suggested for use in implementing neural networks (see for example the DaDianNao accelerator disclosed in Y. Chen, T. Luo, S. Liu, S. Zhang, L. He, J. Wang, L. Li, T. Chen, Z. Xu, N. Sun, and O. Temam, "Dadiannao: A machine-learning supercomputer," in Microarchitecture (MICRO), 2014 47th Annual IEEE/ACM International Symposium on, pp. 609-622, December 2014, hereby incorporated by reference). In an example of such an engine, which will be referred to as a BASE engine, 8 inner product units (IP) may be provided, each accepting 16 input activations and 16 weights as inputs. Where 8 IPs are used, the 16 input activations may be broadcast to all 8 IPs and each IP may receive its own 16 weights; every cycle each IP multiplies 16 input activations by their 16 corresponding weights and reduces them into a single partial output activation using a 16 32b input adder tree. The partial results may be accumulated over multiple cycles to generate the final output activation. An activation memory may provide the activations and a weight memory may provide the weights.

Variations of data parallel engines may be used to implement the computational arrangements discussed above, such as the examples shown in FIG. 3.

Figure 3A:
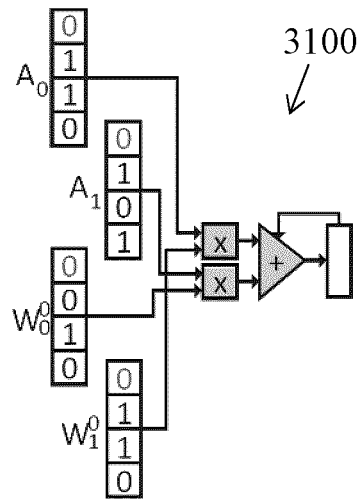
FIGS. 3A, 3B, and 3C are schematic diagrams of three example processing engines.

FIG. 3A is a simplified schematic diagram of a bit-parallel engine 3100, shown multiplying two 4b activation and weight pairs, generating a single 4b output activation per cycle. 4b and other bit sizes are used in various parts of this description as examples, and other sizes may be used in other embodiments. The throughput of engine 3100 is two 4b×4b products per cycle.

Figure 3B:
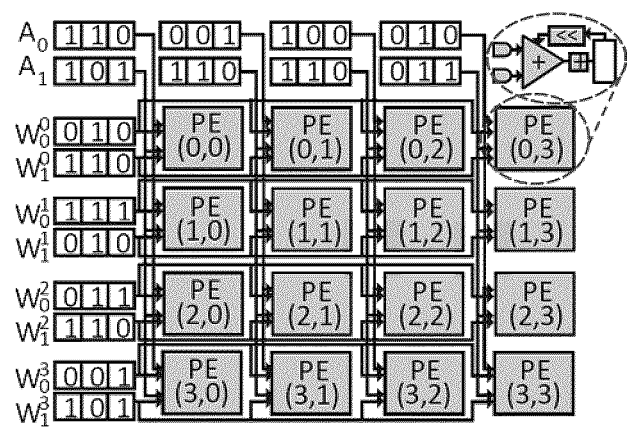

FIG. 3B is a simplified schematic diagram of a bit-serial engine 3200 (see for example S. Sharify, A. D. Lascorz, P. Judd, and A. Moshovos, "Loom: Exploiting weight and activation precisions to accelerate convolutional neural networks," CoRR, vol. abs/1706.07853, 2017, incorporated by reference above). To match the bit-parallel engine 3100 throughput, engine 3200 processes 8 input activations and 8 weights every cycle producing 32 1b×1b products. As both activations and weights are processed bit-serially, engine 3200 results in 16 output activations in $P_a \times P_w$ cycles, where $P_a$ and $P_w$ are the activation and weight precisions, respectively. As a result, engine 3200 outperforms engine 3100 by $$\frac{16}{P_a \times P_w}.$$

As depicted in FIG. 3B, since both activations and weights can be represented in three bits, the speedup of engine 3200 over engine 3100 of FIG. 3A is 1.78×. Yet, engine 3200 still processes some ineffectual terms; for example, in the first cycle 27 of the 32 1b×1b products are zero and thus ineffectual.

Figure 3C:
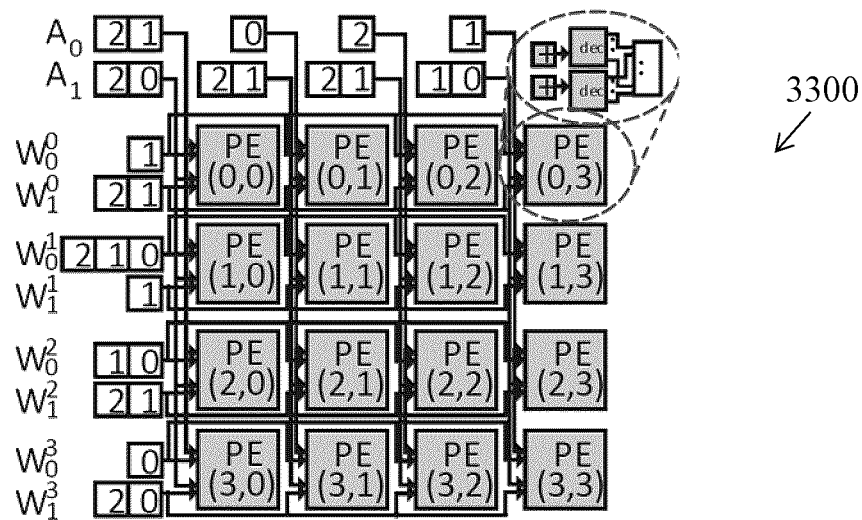

FIG. 3C is a simplified schematic diagram of an engine 3300 in which both the activations and weights are represented as vectors of essential powers of two (or 'one-offsets'). For example, $A_0=(110)$ is represented as a vector of its one-offsets $A_0=(2,1)$. Every cycle each processing element ('PE') accepts a 4b one-offset of an input activation and a 4b one-offset of a weight and adds them up to produce the power of the corresponding product term in the output activation. Since engine 3300 processes activation and weights term-serially, it takes $t_a \times t_w$ cycles for each PE to produce the product terms of an output activation, where $t_a$ and $t_w$ are the number of one-offsets in the corresponding input activation and weight. The engine processes the next set of activation and weight one-offsets after T cycles, where T is the maximum $t_a \times t_w$ among all the PEs. In the example of FIG. 3C, the maximum T is 6 corresponding to the pair of $A_0=(2,1)$ and $W_0^1=(2, 1, 0)$ from PE(1,0). Thus, the engine 3300 can start processing the next set of activations and weights after 6 cycles, achieving 2.67× speedup over the bit-parallel engine 3100 of FIG. 3A.

Some embodiments of the present invention are designed to minimize the required computation for producing the products of input activations and weights by processing only the essential bits of both the input activations and weights. In some embodiments, input activations and weights are converted on-the-fly into a representation which contains only the essential bits, and processes one pair of essential bits each cycle: one activation bit and one weight bit.

In some embodiments, a hardware accelerator may be provided for processing only essential bits, whether those essential bits are processed in the form of one-offsets, regular positional representations, non-fixed-point representations, or other representations of the essential bits.

In embodiments in which the essential bits are processed in the form of one-offsets, an accelerator may represent each activation or weight as a list of its one-offsets $(o_n, \ldots, o_0)$. Each one-offset is represented as a (sign, magnitude) pair. For example, an activation $A=-2_{(10)}=1110_{(2)}$ with a Booth-encoding of $0010_{(2)}$ would be represented as $(-,1)$ and a $A=7_{(10)}=0111_{(2)}$ will be presented as $((+,3), (-,0))$. The sign can be encoded using a single bit, with, for example, 0 representing "+" and 1 representing "−".

In some embodiments, a weight $W=(W_{terms})$ and an input activation $A=(A_{terms})$ are each represented as a (sign, magnitude) pair, $(s_i,t_i)$ and $(s'_i,t'_i)$ respectively, and the product is calculated as set out in equation (3) below:

$$W \times A = \sum_{\forall (s,t) \in W_{terms}} (-1)^s 2^t \times \sum_{\forall (s',t') \in A_{terms}} (-1)^{s'} 2^{t'} = \qquad (3)$$

$$((-1)^{s_0} 2^{t_0} + (-1)^{s_1} 2^{t_1} - \ldots + (-1)^{s_n} 2^{t_n}) \times$$

$$((-1)^{s'_0} 2^{t'_0} - (-1)^{s'_1} 2^{t'_1} + \ldots + (-1)^{s'_m} 2^{t'_m}) =$$

$$((-1)^{s_0}(-1)^{s'_0}(2^{t_0} \times 2^{t'_0}) - \ldots - ((-1)^{s_0}(-1)^{s'_m} 2^{t_0} \times 2^{t'_m})) - \ldots +$$

$$((-1)^{s_n}(-1)^{s'_0}(2^{t_n} \times 2^{t'_0}) + \ldots + ((-1)^{s_n}(-1)^{s'_m} 2^{t_n} \times 2^{t'_m})) =$$

$$((-1)^{(s_0-s'_0)} 2^{(t_0+t'_0)} + \ldots - (-1)^{(s_0+s'_m)} 2^{(t_0+t'_m)}) + \ldots +$$

$$((-1)^{(s_n+s'_0)} 2^{(t_n+t'_0)} + \ldots + (-1)^{(s_n-s'_m)} 2^{(t_n+t'_m)})$$

Implementing equation (3), instead of processing the full A×W product in a single cycle, an accelerator processes each product of a single t' term of the input activation A and of a single t term of the weight W individually. Since these terms are powers of two, their product will also be a power of two. As such, embodiments implementing equation (3) can first add the corresponding exponents t'+t. If a single product is processed per cycle, the $2^{t'+t}$ final value can be calculated via a decoder. Where more than one term pair is processed per cycle, embodiments can use one decoder per term pair to calculate the individual $2^{t'+t}$ products and then employ an efficient adder tree to accumulate all, as described further below with reference to an exemplary embodiment.

Figure 4A:
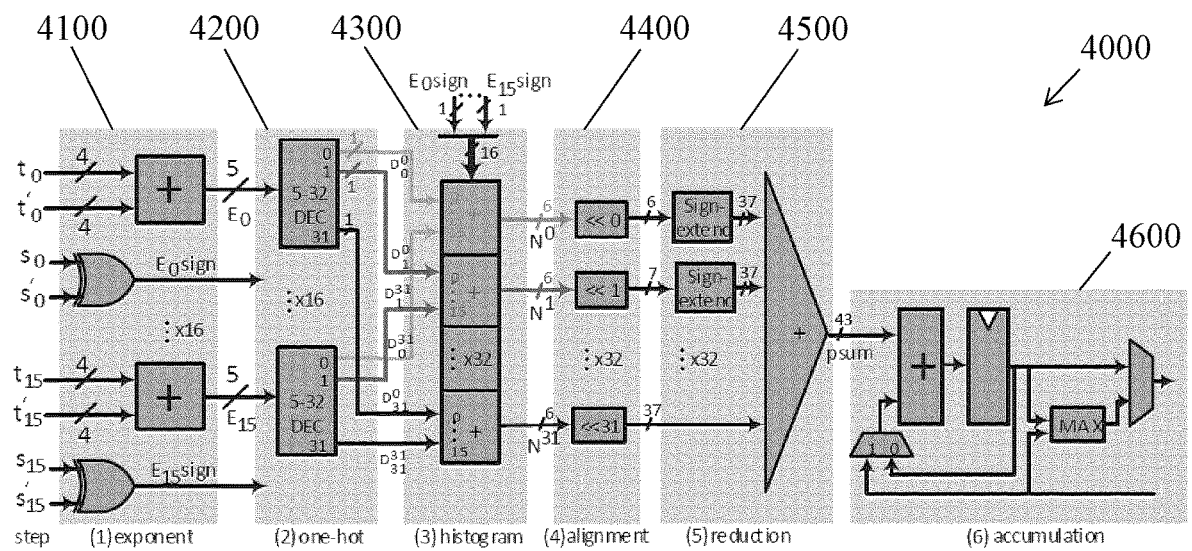
FIG. 4A is a schematic diagram of a processing element, according to an embodiment.

FIG. 4A is a schematic diagram of exemplary processing element (PE) 4000 of an embodiment, such as may be used in an engine or computational arrangement implementing a neural network. PE 4000 implements six steps, each step implemented using a processing sub-element. In some embodiments, various sub-elements of a processing element, such as the sub-elements of PE 4000 described below, may be merged or split with various hardware and software implementations. Processing element 4000 is set up to multiply 16 weights, $W_0, \ldots, W_{15}$, by 16 input activations, $A_0, \ldots, A_{15}$.

A first sub-element is an exponent sub-element 4100, which accepts 16 4b weight one-offsets, $t_0, \ldots, t_{15}$ and their 16 corresponding sign bits $s_0, \ldots, s_{15}$, along with 16 4-bit activation one-offsets, $t'_0, \ldots, t'_{15}$ and their signs $s'_0, \ldots, s'_{15}$, and calculates 16 one-offset pair products. Since all one-offsets are powers of two, their products will also be powers of two. Accordingly, to multiply 16 activations by their corresponding weights PE 4000 adds their one-offsets to generate the 5-bit exponents $(t_0+t_0'), \ldots, (t_{15}+t_{15}')$ and uses 16 XOR gates to determine the signs of the products.

A second sub-element is a one-hot encoder 4200. For the $i^{th}$ pair of activation and weight, wherein i is $\in \{0, \ldots, 15\}$, one-hot encoder 4200 calculates $2^{t_i+t_i'}$ via a 5b-to-32b decoder which converts the 5-bit exponent result $(t_i+t_i')$ into its corresponding one-hot format, being a 32-bit number with one '1' bit and 31 '0' bits. The single '1' bit in the $j^{th}$ position of a decoder output corresponds to a value of either $+2^j$ or $-2^j$ depending on the sign of the corresponding product, being $E_i$ sign as shown in FIG. 4A.

A third sub-element is a histogrammer 4300, which generates the equivalent of a histogram of the decoder output values. Histogrammer 4300 accumulates the 16 32b numbers from one-hot encoder 4200 into 32 buckets, $N^0, \ldots, N^{31}$ corresponding to the values of $2^0, \ldots, 2^{31}$, as there are 32 powers of two. The signs of these numbers, being $E_i$ sign as taken from one-hot encoder 4200, are also taken into account. Following this, each bucket contains the count of the number of inputs that had the corresponding value. Since each bucket has 16 signed inputs, the resulting count would be in the range of −16 to 16 and thus is represented by 6 bits in 2's complement.

Fourth and fifth sub-elements are aligner 4400 and reducer 4500, respectively. Aligner 4400 shifts the counts according to their weight, converting all to 31+6=37 b and then reducer uses a 32-input adder tree to reduce the 32 6b counts into the final output, as indicated in FIG. 4A.

Following reduction, a sixth sub-element is an accumulation sub-element 4600. Accumulation sub-element 4600 accepts a partial sum from reducer 4500. Accumulation sub-element 4600 then accumulates the newly received partial sum with any partial sum held in an accumulator. This way the complete A×W product can be calculated over multiple cycles, one effectual pair of one-offsets per cycle.

Figure 4B:
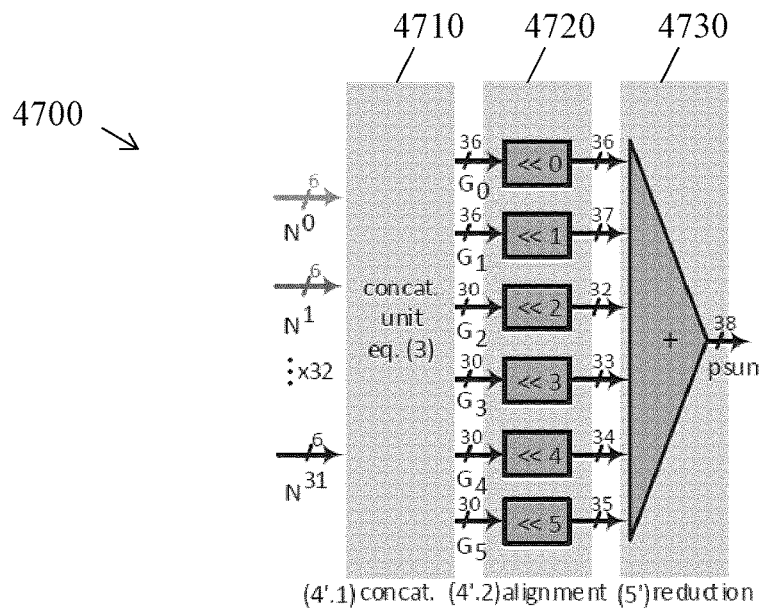
FIG. 4B is a schematic diagram of a portion of a processing element, according to an embodiment.

In some embodiments, sub-element designs may be better able to take advantage of the structure of information being processed. For example, FIG. 4B is a schematic diagram of a concatenator, aligner and reducer sub-element 4700. In some embodiments, both aligner 4400 and reducer 4500 of PE 4000 are replaced by concatenator, aligner and reducer sub-element 4700, which comprises concatenator 4710, aligner 4720, and reducer 4730.

Replacing aligner 4400 and reducer 4500 of PE 4000 with concatenator, aligner and reducer sub-element 4700 has the effect of adding a new concatenator to PE 4000, the new concatenator being sub-element 4710. The addition of a new concatenator also allows changes to be made to the aligner and reducer, such as to make these sub-elements smaller and more efficient; reflective changes to aligner 4400 to implement aligner sub-element 4720, and reflective changes to reducer 4500 to implement reducer sub-element 4730.

Instead of shifting and adding the 32 6b counts, concatenator, aligner and reducer sub-element 4700 seeks to reduce costs and energy by exploiting the relative weighting of each count by grouping and concatenating them as shown in FIG. 4B. For example, rather than adding Nand $N^6$ they are simply concatenated as they are guaranteed to have no overlapping bits that are '1'. The concatenated values are then added via a 6-input adder tree to produce a 38b partial sum to be output to accumulation sub-element 4600.

Concatenator, aligner and reducer sub-element 4700 implements a more energy and area efficient adder tree than possible using aligner 4400 and reducer 4500, and takes advantage of the fact that the outputs of histogrammer 4300 contain groups of numbers that have no overlapping bits that are '1'.

Figure 5A:
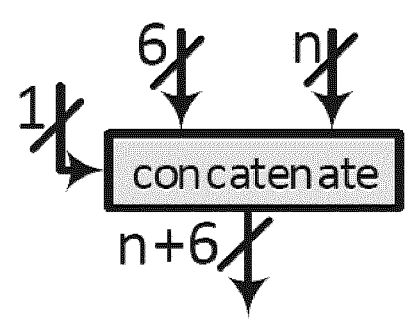
FIGS. 5A and 5B are schematic diagrams of concatenation units, according to embodiments.

As an example, consider adding the $6^{th}$ 6b input $(N^6 = n_5^6 n_4^6 n_3^6 n_2^6 n_1^6 n_0^6)$ with the $0^{th}$ 6b input $(N^0 = n_5^0 n_4^0 n_3^0 n_2^0 n_1^0 n_0^0)$. Using the adder of aligner 4400 and reducer 4500 the $6^{th}$ input $N^6$ must be shifted by 6 bits, which amounts to adding 6 zeros as the 6 least significant bits of the result. In this case, there will be no bit position in which both $N^6$ shifted by 6 and $N^0$ will have a bit that is 1. Accordingly, adding ($N^6 << 6$) and $N^0$ is equivalent to concatenating either $N^6$ and $N^0$ or ($N^6 - 1$) and $N^0$ based on the sign bit of $N^0$, as depicted schematically in FIG. 5A as concatenate unit 5100 and numerically in computation (4) below:

$$N^6 \times 2^6 + N^0 = (N^6 << 6) + N^0 \quad (4)$$

1) if $n_5^0$ is zero:

$$= n_5^6 n_4^6 n_3^6 n_2^6 n_1^6 n_0^6 000000 + 000000 n_5^0 n_4^0 n_3^0 n_2^0 n_1^0 n_0^0$$
$$= n_5^6 n_4^6 n_3^6 n_2^6 n_1^6 n_0^6 n_5^0 n_4^0 n_3^0 n_2^0 n_1^0 n_0^0 = \{N^6 \cdot N^0\}$$

2) else if $n_5^0$ is one:

$$= n_5^6 n_4^6 n_3^6 n_2^6 n_1^6 n_0^6 000000 + 111111 n_5^0 n_4^0 n_3^0 n_2^0 n_1^0 n_0^0$$
$$= (n_5^6 + 1)(n_4^6 + 1)(n_3^6 + 1)(n_2^6 + 1)(n_1^6 + 1)(n_0^6 + 1) n_5^0 n_4^0 n_3^0 n_2^0 n_1^0 n_0^0$$
$$= \{(N^6 - 1) \cdot N^0\}$$

Figure 5B:
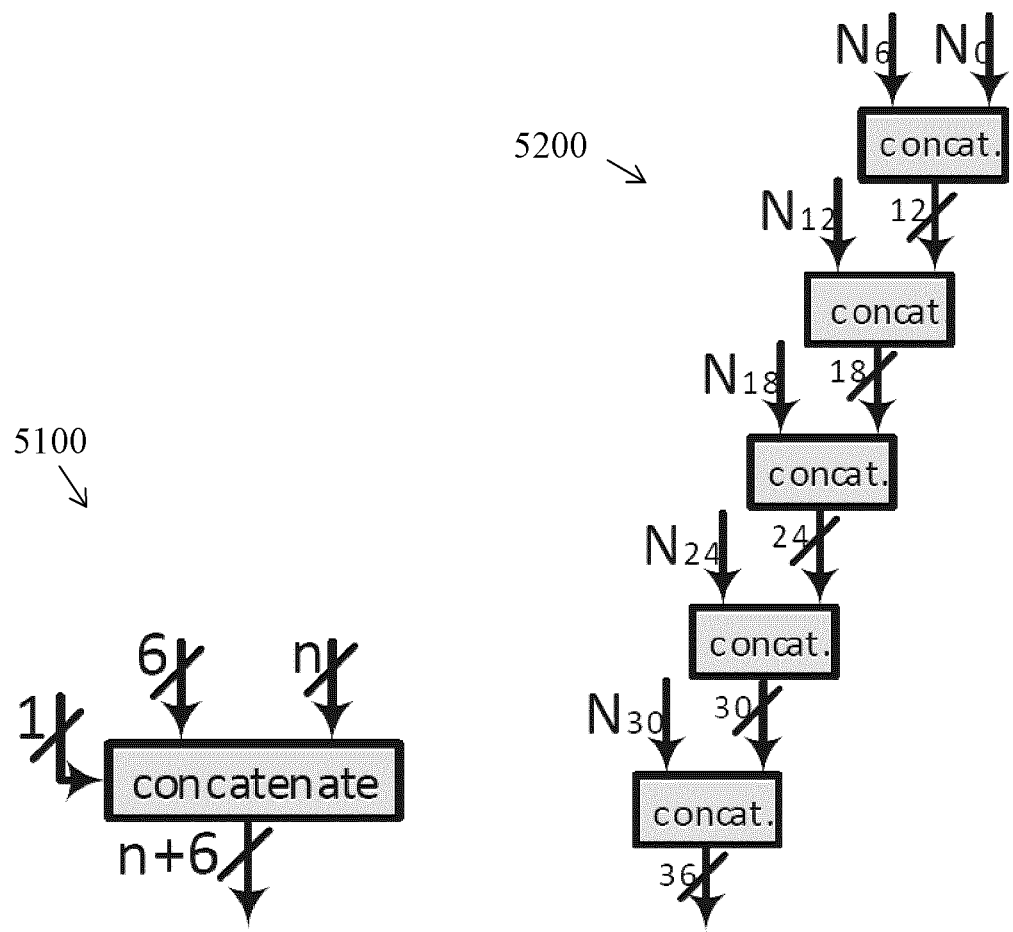

Accordingly, this process is applied recursively, by grouping those $N^i$ where (i MOD 6) is equal. That is, the $i^{th}$ input would be concatenated with $(i+6)^{th}$, $(i+12)^{th}$, and so on. Example concatenating unit 5200 of FIG. 5B implements recursive concatenation as a stack for those $N^i$ inputs where (i MOD 6)=0, although other implementations are possible in other embodiments. For the 16-product unit described above, the process yields the six grouped counts of depiction (5) below:

$$G_0 = \{N^{30} \cdot N^{24} \cdot N^{18} \cdot N^{12} \cdot N^6 \cdot N^0\}$$

$$G_1 = \{N^{31} \cdot N^{25} \cdot N^{19} \cdot N^{13} \cdot N^7 \cdot N^1\}$$

$$G_2 = \{N^{26} \cdot N^{20} \cdot N^{14} \cdot N^8 \cdot N^2\}$$

$$G_3 = \{N^{27} \cdot N^{21} \cdot N^{15} \cdot N^9 \cdot N^3\}$$

$$G_4 = \{N^{28} \cdot N^{22} \cdot N^{16} \cdot N^{10} \cdot N^4\}$$

$$G_5 = \{N^{29} \cdot N^{23} N^{17} N^{11} N^5\}$$

The final partial sum is then given by equation (6) below:

$$psum = \sum_{i=0}^{5} (G_i << i) \quad (6)$$

Figure 6:
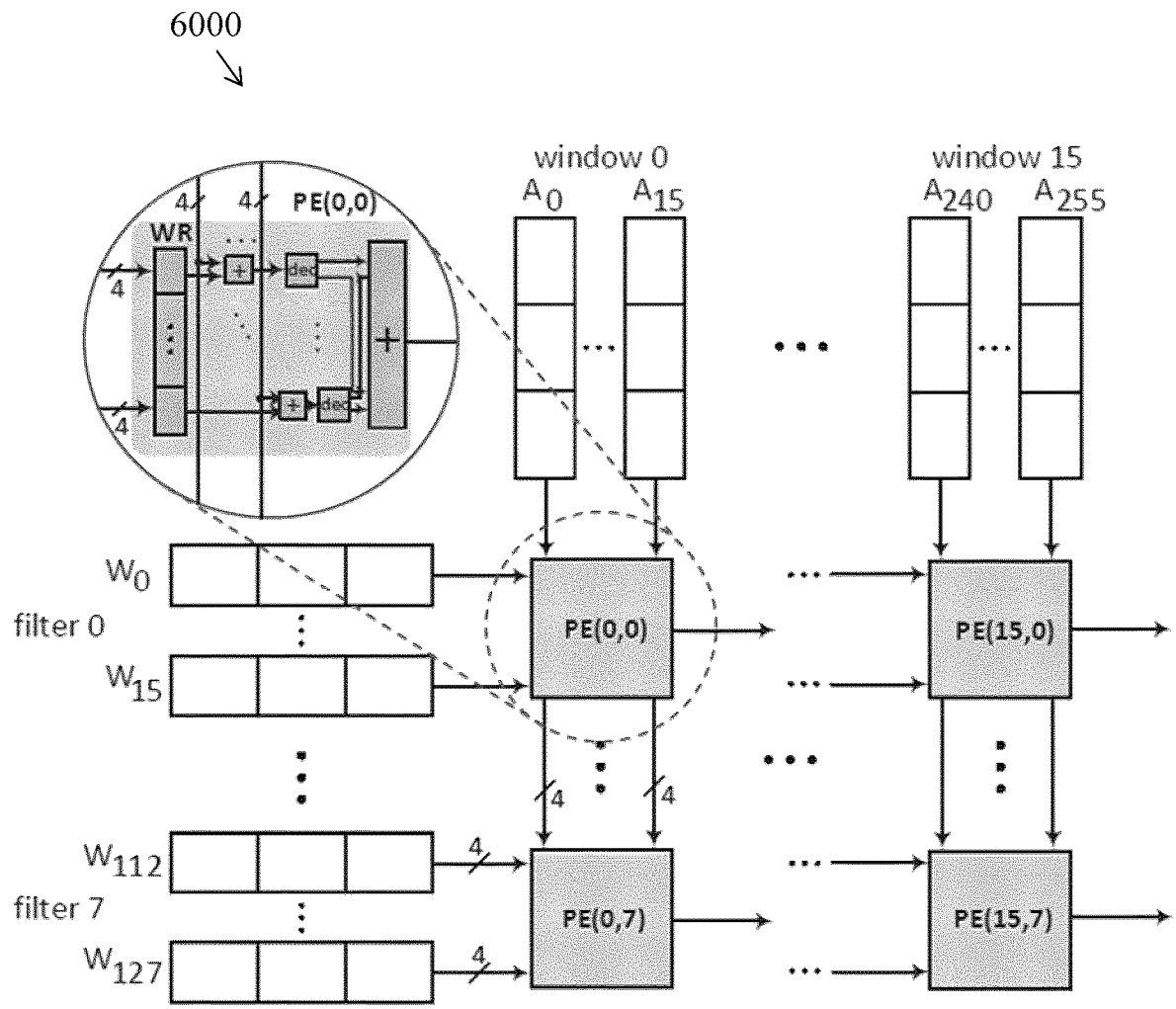
FIG. 6 is a schematic diagram of an accelerator tile, according to an embodiment.

A hardware accelerator tile 6000 is depicted in FIG. 6. Tile 6000 is a 2D array of PEs, such as PE 4000 of FIG. 4, processing 16 windows of input activations and K=8 filters every cycle. PEs along the same column share the same input activations and PEs along the same row receive the same weights. Every cycle PE(i,j) receives the next one-offset from each input activation from the $j^{th}$ window and multiplies it by a one-offset of the corresponding weight from the $i^{th}$ filter. Tile 6000 starts processing the next set of activations and weights when all the PEs are finished with processing the terms of the current set of 16 activations and their corresponding weights.

As tiles such as tile 6000 process both activations and weights term-serially, to match the BASE configuration it must process more filters or windows concurrently. In the worst case each activation and weight possess 16 terms, thus tiles such as tile 6000 should process 8×16=128 filters in parallel to match the peak compute bandwidth of BASE. However, as indicated in FIG. 1, with 16× more filters, the performance of some example implementations using tiles such as tile 6000 is more than two orders of magnitude improved over the BASE performance. Further, an embodiment can use a modified Booth encoding and reduce the worst case of terms to 8 per weight or activation.

Figure 7A:
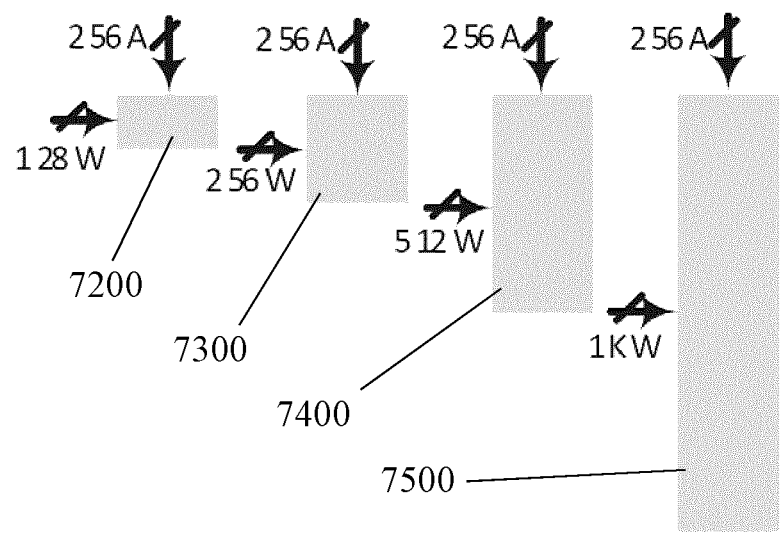
FIGS. 7A and 7B are schematic diagrams of example accelerator tile configurations.
Figure 7B:
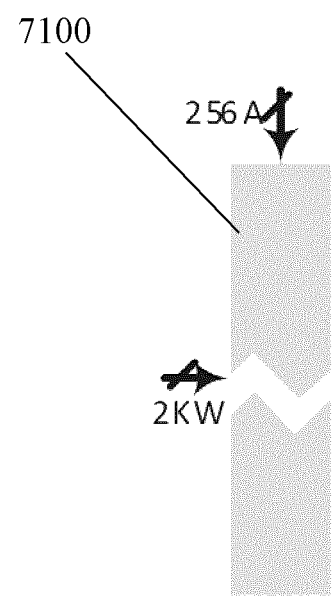
Figure 8:
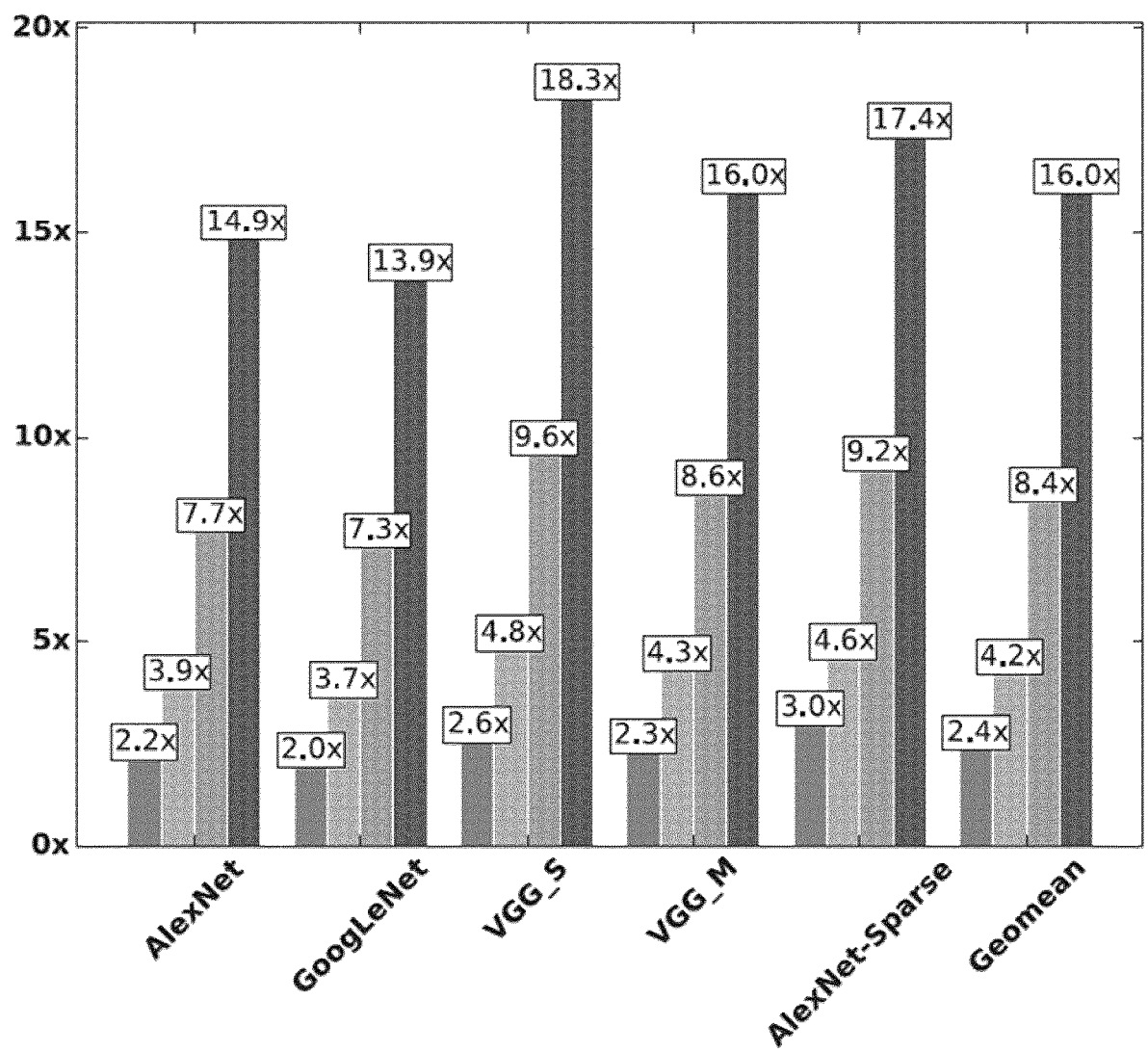
FIG. 8 is a bar graph comparing the performance of a set of example tile configurations across a number of networks.

FIGS. 7A and 7B are schematic drawings of several hardware accelerator configurations, the performance of which is compared in FIG. 8. As indicated in FIG. 7B, a BASE configuration 7100 can process 8 filters with 16 weights per filter using around 2,000 wires. As indicated in FIG. 7A, using tiles such as tile 6000, configuration 7200 can process 8 filters using 128 wires, configuration 7300 can process 16 filters using 256 wires, configuration 7400 can process 32 filters using 512 wires, and configuration 7500 can process 64 filters using around 1,000 wires. In each configuration of FIG. 7 the number of activation wires is set to 256. In other embodiments, other configurations could be employed, such as fixing the number of filters and weight wires and increasing the number of activation windows and wires.

FIG. 8 compares the performance of configurations 7100 to 7500 illustrated in FIG. 7. The bar graph of FIG. 8 shows the relative performance improvement of configurations 7200 to 7500 over configuration 7100 as a set of four bar graphs for each of six models, the six models identified below each set of bars. The relative improvement of configuration 7200 is shown as the leftmost bar of each set, the relative improvement of configuration 7300 is shown as the second bar from the left of each set, the relative improvement of configuration 7400 is shown as the third bar from the left of each set, and the relative improvement of configuration 7500 is shown as rightmost bar of each set.

Simulations of embodiments of the present invention indicate that such embodiments deliver improvements in execution time, energy efficiency, and area efficiency. A custom cycle-accurate simulator was used to model execution time of tested embodiments. Post layout simulations of the designs were used to test energy and area results. Synopsys Design Compiler (see for example Synopsys, "Design Compiler." http://www.synopsys.com/Tools/Implementation/RTLSynthesis/DesignCompiler/Pages, hereby incorporated by reference) was used to synthesize the designs with TSMC 65 nm library. Layouts were produced with Cadence Innovus (see for example Cadence, "Encounter rtl compiler." https://www.cadence.com/content/cadencewww/global/en_US/home/training/all-courses/84441.html, hereby incorporated by reference) using synthesis results. Intel PSG ModelSim was used to generate data-driven activity factors to report the power numbers. The clock frequency of all designs was set to 1 GHz. The ABin and About SRAM buffers were modeled with CACTI (see for example N. Muralimanohar and R. Balasubramonian, "Cacti 6.0: A tool to understand large caches," 2015, hereby incorporated by reference) and the activation memory and weight memory were modeled as eDRAM with Destiny (see for example M. Poremba, S. Mittal, D. Li, J. Vetter, and Y. Xie, "Destiny: A tool for modeling emerging 3d nvm and edram caches," in Design, Automation Test in Europe Conference Exhibition (DATE), 2015, pp. 1543-1546, March 2015, hereby incorporated by reference).

FIG. 8 indicates the performance of configurations 7200 to 7500 relative to BASE configuration 7100 for convolutional layers with the 100% relative TOP-1 accuracy precision profiles of Table 1, compared using the indicated network architectures (see for example Yang, Tien-Ju and Chen, Yu-Hsin and Sze, Vivienne, "Designing Energy-Efficient Convolutional Neural Networks using Energy-Aware Pruning," in IEEE Conference on Computer Vision and Pattern Recognition (CVPR), 2017, hereby incorporated by reference):

TABLE 1

Activation and weight precision profiles in bits for the convolutional layers.

| Network | Convolutional Layers 100% Accuracy | |
| --- | --- | --- |
| | Activation Precision Per Layer | Weight Precision Per Network |
| AlexNet | 9-8-5-5-7 | 11 |
| GoogLeNet | 10-8-10-9-8-10-9-8-9-10-7 | 11 |
| VGGS | 7-8-9-7-9 | 12 |
| VGGM | 7-7-7-8-7 | 12 |
| AlexNet-Sparse | 8-9-9-9-8 | 7 |

In some embodiments, further rewards result from the use of embodiment of the present invention with certain models, such as models designed to have a reduced precision, models which use alternative numeric representations that reduce the number of bits that are '1', or models with increased weight or activation sparsity. However, embodiments of the present invention target both dense and sparse networks and improve performance by processing only essential terms.

As indicated in FIG. 8, on average, configuration 7200 outperforms configuration 7100 by more than 2× while for AlexNet-Sparse, a sparse network, it achieves a speedup of 3× over configuration 7100. As indicated in FIG. 8, configurations 7300 to 7500 deliver speedups of up to 4.8×, 9.6×, and 18.3× over configuration 7100, respectively.

The energy efficiency of configurations 7200 to 7500 relative to configuration 7100 are shown in Table 2, below. As configurations using tiles such as tile 6000 require less on-chip memory and communicate fewer bits per weight and activation, the overall energy efficiency is generally higher.

TABLE 2 compute unit energy efficiency relative to $BASE_{2K}$.

|  | 7200 | 7300 | 7400 | 7500 |
|---|---|---|---|---|
| AlexNet | 4.67 | 2.38 | 1.94 | 1.00 |
| GoogLeNet | 4.25 | 2.26 | 1.84 | 0.94 |
| VGG_S | 5.59 | 2.96 | 2.42 | 1.23 |
| VGG_M | 5.03 | 2.65 | 2.17 | 1.08 |
| AlexNet-Sparse | 6.49 | 2.83 | 2.33 | 1.17 |
| Geomean | 5.15 | 2.60 | 2.13 | 1.08 |

Post layout measurements were used to measure the area of configurations 7100 to 7500. Configuration 7200 requires 1.78× the area of configuration 7100 while achieve an average speedup of 2.4×. The area overhead for 7300 is 3.56×, the area overhead for 7400 is 7.08×, and the area overhead for 7500 is 14.15×, while execution time improvements over configuration 7100 are 4.2×, 8.4×, and 16× on average, respectively. As such, tiles such as tile 6000 provide better performance vs. area scaling than configuration 7100.

Figure 9:
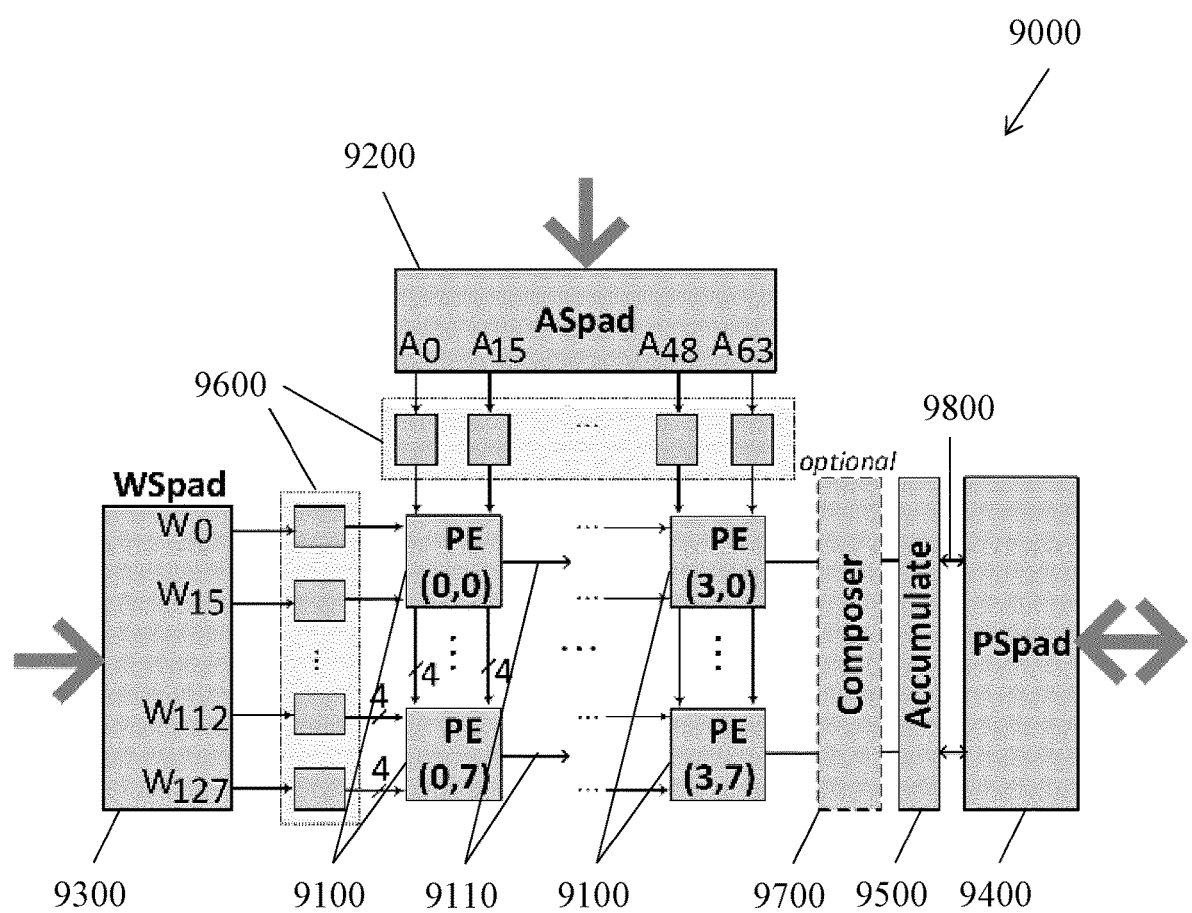
FIG. 9 is a schematic diagram of an example accelerator tile configuration.

The number of activation and weight pairs processed by a tile or accelerator can be varied. Some processor elements process 16 activation and weight pairs per cycle, all contributing to the same output activation. Some processor elements process other than 16 pairs per cycle. Some accelerator embodiments combine multiple tiles or processor elements of the same or different configurations. FIG. 9 is a schematic diagram of a tile 9000 containing 32 processor elements 9100 organized in an 8 by 4 grid. Input scratchpads, i.e., small local memory, provide activation and weight inputs, an activation pad 9200 providing activation inputs and a weight pad 9300 providing weight inputs. In some layers the activation pad 9200 provides weight inputs and the weight pad 9300 provides activation inputs. A third scratchpad, storage pad 9400, is used to store partial or complete output neurons.

A bus 9110 is provided for each row of processing elements 9100 to connect them to the storage pad 9400. Partial sums are read out of the processor element grid and accumulated in accumulator 9500 and then written to the storage pad 9400 one column of the processing elements at a time. There is enough time to drain the processing element grid via the common bus 9800. Since processing of even a single group of activation and weight pair inputs is typically performed over multiple cycles and typically multiple activation and weight pair groups can be processed before the partial sums need to be read out, this provides enough time for each column of processing elements to access the common bus 9800 sequentially to drain its output while the other columns of processing elements are still processing their corresponding activations and weights.

Tile 9000 includes encoders 9600 between the input scratchpads and the processing element grid, one encoder corresponding to each input scratchpad. Encoders 9600 convert values into a series of terms. An optional composer column 9700 provides support for the spatial composition of 16b arithmetic while maintaining 8b processing elements. Tile 9000 allows for the reuse of activations and weights in space and time and minimizes the number of connections or wires needed to supply tile 9000 with activations and weights from the rest of a memory hierarchy.

For example, tile 9000 can proceed with 4 windows of activations and 8 filters per cycle. In this case, the weight pad 9300 provides 16 weights per filter and the activation pad 9200 provides the corresponding 16 activations per window. Processing elements 9100 along the same column share the same input activations, while processing elements 9100 along the same row share the same input weights. Encoders 9600 convert input values into terms at a rate of one term per cycle as each PE can process a single term of activation and a single term of weight every cycle. Each cycle, the processing element in row 'i' and column 'j' multiples the input activation from the jth window by the weight from the ith filter. Once all activation terms have been multiplied with the current weight term, the next weight term is produced. The processing element cycles through all the corresponding activation terms again to multiply them with the new weight term. The product is complete once all weight and activation terms have been processed. If there are 3 activation terms and 4 weight terms, at least 12 cycles will be needed. In total, tile 9000 processes 4 windows, 16 activations per window, and 8 filters; 4 by 16 by 8 activation and weight pairs concurrently.

In practice, the number of terms will vary across weight and activation values, and as a result some processing elements will need more cycles than others to process their product. Tile 9000 implicitly treats all concurrently processed activation and weight pairs as a group and synchronizes processing across different groups; tile 9000 starts processing the next group when all the processing elements are finished processing all the terms of the current group. However, this gives up some speedup potential.

In some embodiments, computation is allowed to proceed in 16 independent groups. For example, the first synchronization group will contain $A_0, A_{16}, A_{24}, \ldots, A_{48}$ and weights $W_0, W_{16}, \ldots, W_{112}$, the second group will contain $A_1, A_{17}, A_{25}, \ldots, A_{49}$ and weights $W_1, W_{17}, \ldots, W_{113}$, and so on for the remaining 14 groups. This example is referred to as comb synchronization, since the groups physically form a comb-like pattern over the grid. A set of buffers at the inputs of the booth-encoders 9600 can be used to allow the groups to slide ahead of one another.

Some neural networks required 16b data widths or precisions only for some layers. Some neural networks require 16b data widths or precisions only for the activations, and few values require more than 8b. In some embodiments, a tile supports the worst-case data width required across all layers and all values. However, in some embodiments, tiles support data type composition in space or time or both space and time.

For example, a tile design can allow for 16b calculations over 8b processing elements for activations and optionally for weights. Although other bit widths can also be used. Tile designs can be useful for neural networks which require more than 8b for only some of their layers.

Figure 10:
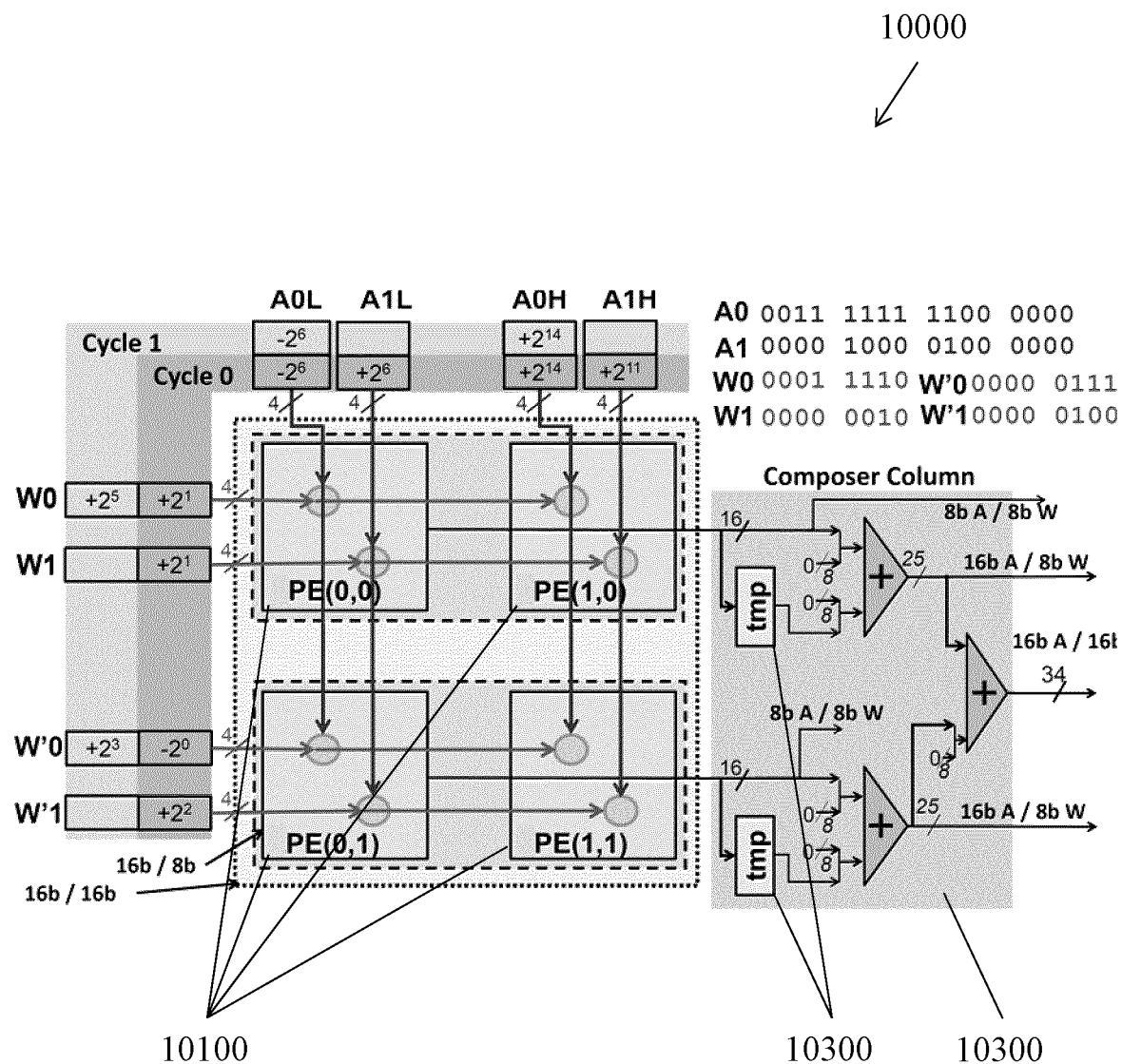
FIG. 10 is a schematic diagram of an example accelerator tile configuration.

A spatial composition tile is shown in FIG. 10. Tile 10000 uses multiple yet unmodified 8b processing elements. The spatial composition tile requires extra processing elements whenever it processes a layer that has 16b values. Tile 10000 is a 2 by 2 grid of 8b processing elements 10100 to extend to support the following weight and activation combinations: 8b and 8b, 16b and 8b, and 16b and 16b. The normalized peak compute throughput is respectively: 1, ½, and ¼. To support 16b and 8b computation the activation terms are split into those corresponding to their lower and upper bytes which are processed respectively by two adjacent processing element ("PE") columns.

In the example indicated in FIG. 10, PE(0,0) and PE(0,1) process the lower bytes of $A_0$ and $A_1$ and PE(1,0) and PE(1,1) process the upper bytes. Rows 0 and 1 respectively process filters 0 and 1 as before. Processing proceeds until the accumulation sub-element 4600 have accumulated the sums of the upper and lower bytes for the data block. At the end, the partial sum registers are drained one column at a time. A composer column 10200 is added at the grid's output. When the partial sums of column 0 are read out, they are captured in the respective temporary registers ("tmp") 10300. Next cycle, the partial sums of column 1 appear on the output bus. The per row adders of the composer 10200 add the two halves and produce the final partial sum. While the example shows a 2 by 2 grid, the concept applies without modification to larger processing element grids. A single composer column is sufficient as the grid uses a common bus per row to output the partial sums one column at a time. While not shown, the composer can reuse the accumulate column adders instead of introducing a new set. In general, supporting 16b activations would require two adjacent per row processor elements.

Tile 10000 also supports 16b weights by splitting them along two rows. This requires four processing elements each assigned to one of the four combinations of lower and upper bytes. In FIG. 10, PE(0,0), PE(1,0), PE(0,1) and PE(1,1) will respectively calculate $(A_L, W_L)$, $(A_H, W_L)(A_L, W_H)$, and $(A_H, W_D)$. The second level adder in the composer column takes care of combining the results from the rows by zero-padding row 1 appropriately.

Figure 11:
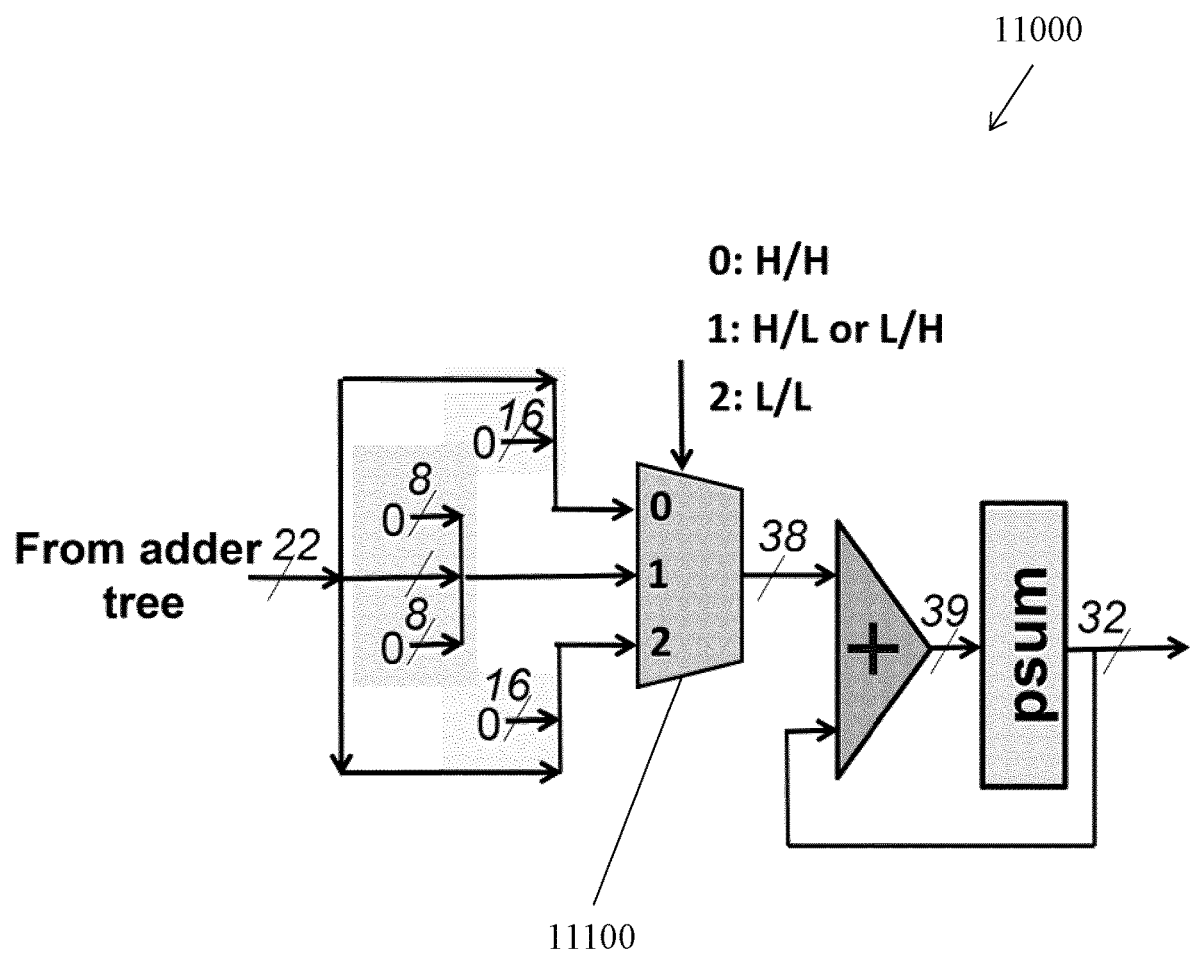
FIG. 11 is a schematic diagram of an accumulator configuration.

A temporal composition tile may also be used. A temporal composition tile would employ temporal composition processing elements. An embodiment of a temporal composition processing element is shown in FIG. 11. Processing element 11000 supports both 8b and 16b operation, albeit at a lower area cost than a native 16b processing element. The temporal composition tile requires extra cycles whenever it has to process 16b values.

Processing element 11000 allows for the splitting of the terms of activations and weights into those belonging to the upper and the lower bytes and the processing of them separately in time. The output from the front-stage adder is appropriately padded with zeros and then added to the extended precision partial sum. There are three cases based on the source of the activation and weight terms being processed: both belong to lower bytes (L/L), both belong to upper bytes (H/H), or one belongs to an upper byte and the other to a lower one (H/L or L/H). The multiplexer 11100 selects the appropriately padded value. The multiplexer's select signal can be shared among all processing elements in a tile. Processing 8b values incurs no overhead. Processing 16b activations and 8b weights (or vice versa) requires an extra cycle, whereas processing 16b weights and activations requires 3 extra cycles. However, this time overhead has to be paid only when there is a value that really needs 16b with the tile having processing element 11000.

A temporal composition tile does not reserve resources for whole layers, and since values that require more than 8b may be few it can be expected to achieve higher throughout per processing element than a spatial composition tile. However, a temporal composition tile requires larger processing elements and more sophisticated control at the booth encoders. In an embodiment, an 8b processing element capable of temporal extension to 16b is 22% smaller compared to a native 16b processing element. In some embodiments, combinations of spatial and temporal designs may be used, such as spatial composition for weights and temporal composition for activations.

In some networks and for some layers (especially the first layer), the data type needed as determined by profiling sometimes exceeds 8b slightly. For example, 9b or 10b is found to be needed. In some embodiments, executing these layers or networks is possible with an unmodified 8b processing element and with a minor modification to the Booth-Encoder. For example, in the case of processing a value which needs the 9th bit, that is where that bit is 1. Since an 8b processing element only supports calculations with up to $+2^7$ the Booth-Encoder can effectively synthesize $+2^8$ by sending $+2^7$ twice. Importantly, this will be needed only for the values where the 9th bit needs to be 1; all negative values in 9b. As an added benefit, this flexibility makes quantization easier for certain networks.

Embodiments presented above exploit inter-value bit-level parallelism. However, some embodiments can exploit intra-value bit-level parallelism and to do so differently than bit-parallel hardware. This is possible, since the processing element produces the correct result even if the terms of a value are processed spatially instead of temporally. For example, if two input lanes are assigned per weight and Booth-encoder is modified so that it outputs up to two terms per cycle. This also enables an accelerator to exploit bit-level parallelism within values, which may be useful to reduce synchronization overheads. Exploiting bit-level parallelism within values may also be useful to improve utilization for layers where there isn't enough reuse of weights or activations or both activations and weights to fill in all columns or rows or both rows and columns, respectively. This is the case, for example, for fully connected layers where there is no reuse of weights. This optimization helps with energy efficiency as fully connected layers are typically memory bound. It is also useful for depth-separable convolutional layers. Exploiting bit-level parallelism within values may also be useful when there are not enough filters to fill in all rows. This is different than the intra-value bit-level parallelism exploited by conventional bit-parallel units: they process all bits regardless of value whereas embodiments of the present accelerator would process only the effectual ones.

The performance of an 8b accelerator with spatial composable processing elements and the performance of an accelerator with native 16b processing elements have been compared. The 8b spatial composable processing elements supported 8b and 16b weights and activations, and the 8b accelerator was scaled up to use the same compute area as the 16b accelerator. Testing was conducted using the GoogleNet-S and Resnet50-S models. The 8b spatial composable processing accelerator used multiple processing elements as needed only for those layers that required more than 8b precision. The 8b spatial composable processing accelerator was faster than the native 16b accelerator: 1.4 times faster for GoogleNet-S and 1.2 times faster for Resnet50-S.

In other embodiments, other configurations could be used, such as an increased number of weight wires. In some embodiments, performance improves sublinearly, such as due to inter-filter imbalance aggravated by scaling up only by increasing the number of filters. In some embodiments, the number of simultaneously processed activations may be increased instead or in addition to increasing the number of weights. Combining configuration designs with minimal buffering configurations (see for example J. Albericio, A. Delmás, P. Judd, S. Sharify, G. O'Leary, R. Genov, and A. Moshovos, "Bit-pragmatic deep neural network computing," in Proceedings of the 50th Annual IEEE/ACM International Symposium on Microarchitecture, MICRO-50 '17, pp. 382-394, 2017, incorporated by reference above) may also reduce cross-activation imbalances. In other embodiments, the activation and weight memories may be distributed along the tiles or shared among all or groups of them.

Embodiments of the present invention are compatible with compression approaches (see for example A. Delmas, S. Sharify, P. Judd, M. Nikolic, and A. Moshovos, "Dpred: Making typical activation values matter in deep learning computing," CoRR, vol. abs/1804.06732, 2018, hereby incorporated by reference), and can be expected to perform well with practical off-chip memory configurations and interfaces.

It is noted that while portions of the above description and associated figures may describe or suggest the use of hardware, some embodiments may be emulated in software on a processor, such as a GPU (Graphic Processing Unit) and may produce similar performance enhancements. In addition, various components may be dedicated, shared, distributed, or combined with other components; for example, activation and weight memories supplying activation and weight representations may be dedicated, shared, distributed, or combined in various embodiments.

Various embodiments of the invention have been described in detail. Since changes in and or additions to the above-described best mode may be made without departing from the nature, spirit or scope of the invention, the invention is not to be limited to those details but only by the appended claims.

What is claimed is:

1. A neural network accelerator tile, comprising:
    an activation memory interface for interfacing with an activation memory to receive a set of activation representations, wherein the set of activation representations is represented by an exponential expression based on activation exponent values;
    a weight memory interface for interfacing with a weight memory to receive a set of weight representations, wherein the set of weight representations is represented by an exponential expression based on weight exponent values; and
    a processing element configured to implement an exponent sub-element, a one-hot encoder, a histogrammer, an aligner, a reducer, and an accumulation sub-element to process the set of activation representations and the set of weight representations to produce a set of output representations,
    wherein the exponent sub-element performs addition operations using the activation exponent values and the weight exponent values to generate exponent values.

2. The accelerator tile of claim 1, wherein the activation memory interface is configured to provide the set of activation representations to the processing element as a set of activation one-offset pairs, and the weight memory interface is configured to provide the set of weight representations to the processing element as a set of weight one-offset pairs.

3. The accelerator tile of claim 2, wherein the exponent sub-element is configured to combine the set of activation one-offset pairs and the set of weight one-offset pairs to produce a set of one-offset pair products.

4. The accelerator tile of claim 3, wherein the exponent sub-element includes a set of magnitude adders and a corresponding set of sign gates, one pair of magnitude adder and sign gate to provide each one-offset pair product of the set of one-offset pair products.

5. The accelerator tile of claim 1, wherein the one-hot encoder includes a set of decoders to perform one-hot encoding of a set of one-hot encoder inputs.

6. The accelerator tile of claim 2, wherein the histogrammer is configured to sort a set of histogrammer inputs by value.

7. The accelerator tile of claim 2, wherein the aligner is configured to shift a set of aligner inputs to provide a set of shifted inputs to be reduced.

8. The accelerator tile of claim 2, wherein the reducer includes an adder tree to reduce a set of reducer inputs into a partial sum.

9. The accelerator tile of claim 2, wherein the accumulation sub-element includes an accumulator and is configured to receive a partial sum and add the partial sum to the accumulator to accumulate a product over multiple cycles.

10. The accelerator tile of claim 1, wherein the processing element is further configured to implement a concatenator.

11. The accelerator tile of claim 10, wherein the concatenator is provided to concatenate a set of concatenator inputs to produce a set of grouped counts to be shifted and reduced by the aligner and reducer to produce a partial product.

12. A neural network comprising a set of neural network accelerator tiles according to claim 1.

13. The neural network of claim 12, wherein the neural network is implemented as a convolutional neural network.

14. The neural network of claim 12, wherein the set of neural network accelerator tiles includes a column of accelerator tiles, the tiles of the column of accelerator tiles configured to each receive the same set of activation representations and to each receive a unique set of weight representations.

15. The accelerator tile of claim 1, wherein the processing element is configured to, over multiple cycles, process an activation representation of the set of activation representations with a weight representation of the set of weight representations.

16. A method of producing a neural network partial product, implementing processing components including an exponent sub-element, a one-hot encoder, a histogrammer, an aligner and a reducer, the method comprising:
    receiving a set of activation representations, wherein the set of activation representations is represented by an exponential expression based on activation exponent values;
    receiving a set of weight representations, each weight representation corresponding to an activation representation of the set of activation representations, wherein the set of weight representations is represented by an exponential expression based on weight exponent values;
    generating, by the exponent sub-element, a set of partial exponent value results by combining the set of weight representations with the set of activation representations by combining each weight representation with its corresponding activation representation;
    generating, by the one-hot encoder, a set of one-hot representations by encoding the set of partial exponent value results;
    accumulating, by the histogrammer, the set of one-hot representations into a set of histogram bucket counts;
    aligning, by the aligner, the counts of the set of histogram bucket counts according to their size; and
    generating, by the reducer, the neural network partial product by reducing the aligned counts of the set of histogram bucket counts,
    wherein the combination of the set of weight representations with the set of activation representations is based on an addition operation using the activation exponent values and the weight exponent values, and
    wherein the aligner and the reducer operate based on an output, of the histogrammer, that is generated by the histogrammer to not ha q non-zero bits.

17. The method of claim 16, further comprising outputting the neural network partial product to an accumulator to accumulate a product.

18. The method of claim 17, further comprising outputting the product to an activation memory.

19. The method of claim 16, further comprising, prior to aligning the counts of the set of histogram bucket counts, recursively grouping the counts of the set of histogram bucket counts into a set of grouped counts and providing the set of grouped counts to be aligned and reduced in place of the set of histogram bucket counts.

20. The method of claim 16, wherein combining a weight representation of the set of weight representations with an activation representation of the set of activation representations is performed over multiple cycles.

\* \* \* \* \*